US011956695B2

United States Patent
Nagasawa (10) Patent No.: US 11,956,695 B2
(45) Date of Patent: Apr. 9, 2024

(54) SERVER FOR AUTOMATIC EMERGENCY REPORTING SYSTEM OF VEHICLE

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/385,797

(22) Filed: Jul. 26, 2021

(65) Prior Publication Data

US 2022/0038859 A1 Feb. 3, 2022

(30) Foreign Application Priority Data

Jul. 31, 2020 (JP) ................................. 2020-130802

(51) Int. Cl.
*H04W 4/90* (2018.01)
*H04W 4/029* (2018.01)
*H04W 4/40* (2018.01)

(52) U.S. Cl.
CPC ............. *H04W 4/029* (2018.02); *H04W 4/40* (2018.02); *H04W 4/90* (2018.02)

(58) Field of Classification Search
CPC ......... H04W 4/029; H04W 4/40; H04W 4/90; H04W 4/02; H04W 4/44
See application file for complete search history.

(56) References Cited

U.S. PATENT DOCUMENTS

| 9,538,332 | B1 * | 1/2017 | Mendelson | ........... H04W 48/10 |
| 9,706,351 | B1 * | 7/2017 | Brewer | ................... H04W 4/02 |
| 2009/0015684 | A1 | 1/2009 | Ooga et al. | |
| 2014/0273915 | A1 * | 9/2014 | Corley | ................... H04W 4/90 |
| | | | | 455/404.1 |

(Continued)

FOREIGN PATENT DOCUMENTS

| JP | 2001-216588 A | 8/2001 |
| JP | 2001-216589 A | 8/2001 |

(Continued)

OTHER PUBLICATIONS

Notice of Reasons for Refusal issued in the corresponding Japanese Application No. 2020-130802 dated Jan. 30, 2024, w/ English Translation.

*Primary Examiner* — Marcus Hammonds
(74) *Attorney, Agent, or Firm* — Rimon P.C.

(57) ABSTRACT

A server for an automatic emergency reporting system of a vehicle is configured to receive emergency information from the vehicle when the vehicle has an emergency. The server includes a location estimator, a terminal estimator, and an information acquirer. The location estimator is configured to estimate positional information of the vehicle having a possibility of occurrence of the emergency when the positional information is not acquirable from the vehicle. The terminal estimator is configured to estimate a communication terminal around a location indicated by the estimated positional information. The information acquirer is configured to acquire, from the communication terminal estimated to be located around the vehicle having the possibility of the occurrence of the emergency based on the estimated positional information, information held by the communication terminal.

8 Claims, 6 Drawing Sheets

(56) References Cited

U.S. PATENT DOCUMENTS

| | | | |
|---|---|---|---|
| 2016/0029197 A1* | 1/2016 | Gellens | H04L 65/65 455/404.1 |
| 2022/0277598 A1* | 9/2022 | Liu | H04W 4/90 |

FOREIGN PATENT DOCUMENTS

| | | | |
|---|---|---|---|
| JP | 2007-293620 A | 11/2007 |
| JP | 2011-097293 A | 5/2011 |
| WO | 2007-080921 A1 | 7/2007 |

\* cited by examiner

SERVER FOR AUTOMATIC EMERGENCY REPORTING SYSTEM OF VEHICLE

CROSS-REFERENCE TO RELATED APPLICATIONS

The present application claims priority from Japanese Patent Application No. 2020-130802 filed on Jul. 31, 2020, the entire contents of which are hereby incorporated by reference.

BACKGROUND

The disclosure relates to a server for an automatic emergency reporting system of a vehicle.

In the event of an accident of an automobile or other vehicles, the accident may be reported as an emergency. For example, an automatic emergency reporting system for automobiles is put into practical use. In the automatic emergency reporting system, an automobile in an accident uses its automatic reporting device to transmit, to a server of a call center, accident information such as an operation status of an occupant protection device in the accident, a site of the accident, and an input direction and an intensity of a shock caused by the accident (Japanese Unexamined Patent Application Publication No. 2001-216588). In the call center, the server checks the received accident information and makes a call for action to either one of an air medical service and an emergency medical force. Thus, a lead time for either one of a rescue helicopter and an ambulance that is going into action can be shortened to increase a possibility of saving a person in the accident.

SUMMARY

An aspect of the disclosure provides a server for an automatic emergency reporting system of a vehicle. The server is configured to receive emergency information from the vehicle when the vehicle has an emergency. The server includes a location estimator, a terminal estimator, and an information acquirer. The location estimator is configured to estimate positional information of the vehicle having a possibility of occurrence of the emergency when the positional information is not acquirable from the vehicle. The terminal estimator is configured to estimate a communication terminal around a location indicated by the estimated positional information. The information acquirer is configured to acquire, from the communication terminal estimated to be located around the vehicle having the possibility of the occurrence of the emergency based on the estimated positional information, information held by the communication terminal.

An aspect of the disclosure provides a server for an automatic emergency reporting system of a vehicle. The server is configured to receive emergency information from the vehicle when the vehicle has an emergency. The server includes circuitry. The circuitry is configured to estimate positional information of the vehicle having a possibility of occurrence of the emergency when the positional information is not acquirable from the vehicle. The circuitry is configured to estimate a communication terminal around a location indicated by the estimated positional information. The circuitry is configured to acquire, from the communication terminal estimated to be located around the vehicle having the possibility of the occurrence of the emergency based on the estimated positional information, information held by the communication terminal.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to explain the principles of the disclosure.

DETAILED DESCRIPTION

When an automatic reporting device of an automobile in an accident transmits accident information, the accident or other factors may hinder the automatic reporting device from appropriately establishing communication immediately after the accident. For example, the automatic reporting device may malfunction due to the accident. For example, the automatic reporting device that has transmitted positional information may malfunction due to the accident before transmitting the accident information. For example, an information source device that acquires positional information in the automobile may malfunction due to the accident to cause a possibility that the automatic reporting device cannot transmit correct information to a server though the automatic reporting device functions properly.

In those cases, servers that make calls for emergency action in related-art automatic emergency reporting systems cannot acquire appropriate information on the vehicles in the accidents for the calls.

It is desirable to improve the emergency reporting for the vehicles.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
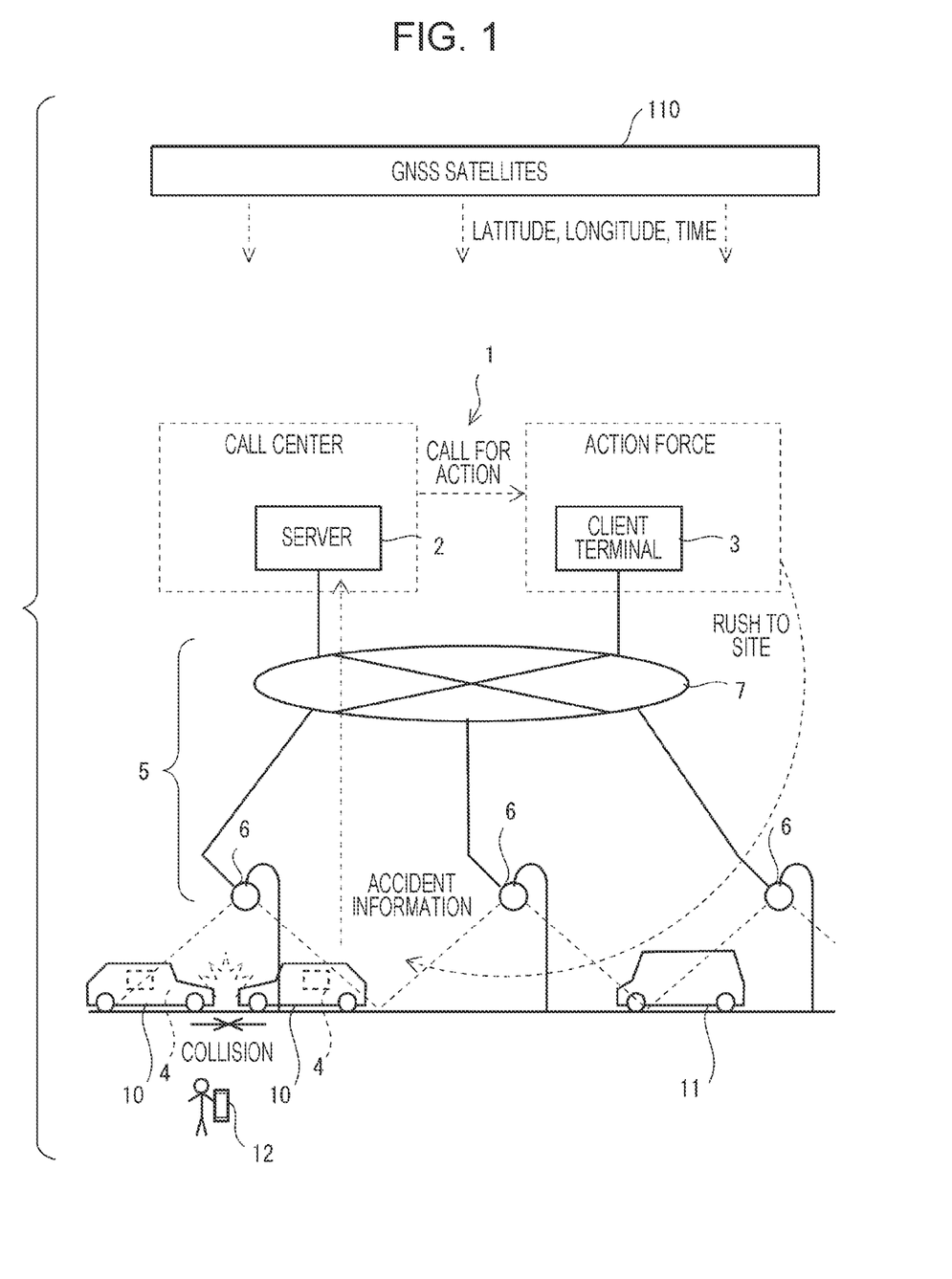
FIG. 1 is an explanatory diagram of an example of an automatic emergency reporting system of a vehicle according to an embodiment of the disclosure.

FIG. 1 is an explanatory diagram of an example of an automatic emergency reporting system 1 of a vehicle according to the embodiment of the disclosure.

The automatic emergency reporting system 1 of FIG. 1 includes a server 2, a client terminal 3, an automatic reporting device 4, and a wireless communication network 5. The server 2 is used at a call center of an organization that manages road accidents caused by, for example, automobiles 10. The client terminal 3 is used at a rescue force such as a fire department. The automatic reporting device 4 is provided in each of the automobiles 10. The wireless communication network 5 provides communication lines for those devices. The wireless communication network 5 includes base stations 6 and a communication network 7. For example, the base stations 6 are distributed in a region along roads to communicate with wireless terminals such as the automatic reporting device 4. The communication network 7 couples the base stations 6. The base station 6 serves as an access point that couples a plurality of wireless terminals in a communicable zone. In FIG. 1, a mobile terminal 12 of a pedestrian is in the zone of the base station 6. The server 2 of the call center and the client terminal 3 of the rescue force are coupled to the communication network 7 of FIG. 1. Examples of the automatic emergency reporting system 1 for accidents include advanced automatic collision notification (AACN). In the AACN, an automobile 10 in an accident promptly and automatically transmits accident information to the server 2 of the call center, and the rescue force sends either one of an ambulance 11 and a rescue helicopter in response to a call for action from the call center. The call center can select a rescue force and make a call for action depending on details of the accident. Either one of the ambulance 11 and the rescue helicopter can go to the site of the accident while grasping the details. Thus, appropriate life-saving treatment can promptly be provided for a person in the accident in a short lead time.

Although the automatic emergency reporting system 1 of FIG. 1 is used by the plurality of organizations in cooperation, the system may be used by, for example, any one of a police, a fire department, a city office, a hospital, a medical organization, a security company, and a management company that manages the region including roads for the automobiles 10.

FIG. 1 illustrates a plurality of GNSS satellites 110. The devices in FIG. 1 can acquire their locations and times by receiving radio waves including positional information (latitudes and longitudes) and time information from the GNSS satellites 110. For example, current times of a plurality of devices can agree with each other with high accuracy by receiving radio waves from a plurality of GNSS satellites 110 in cooperation. Thus, a common time can be used.

Figure 2:
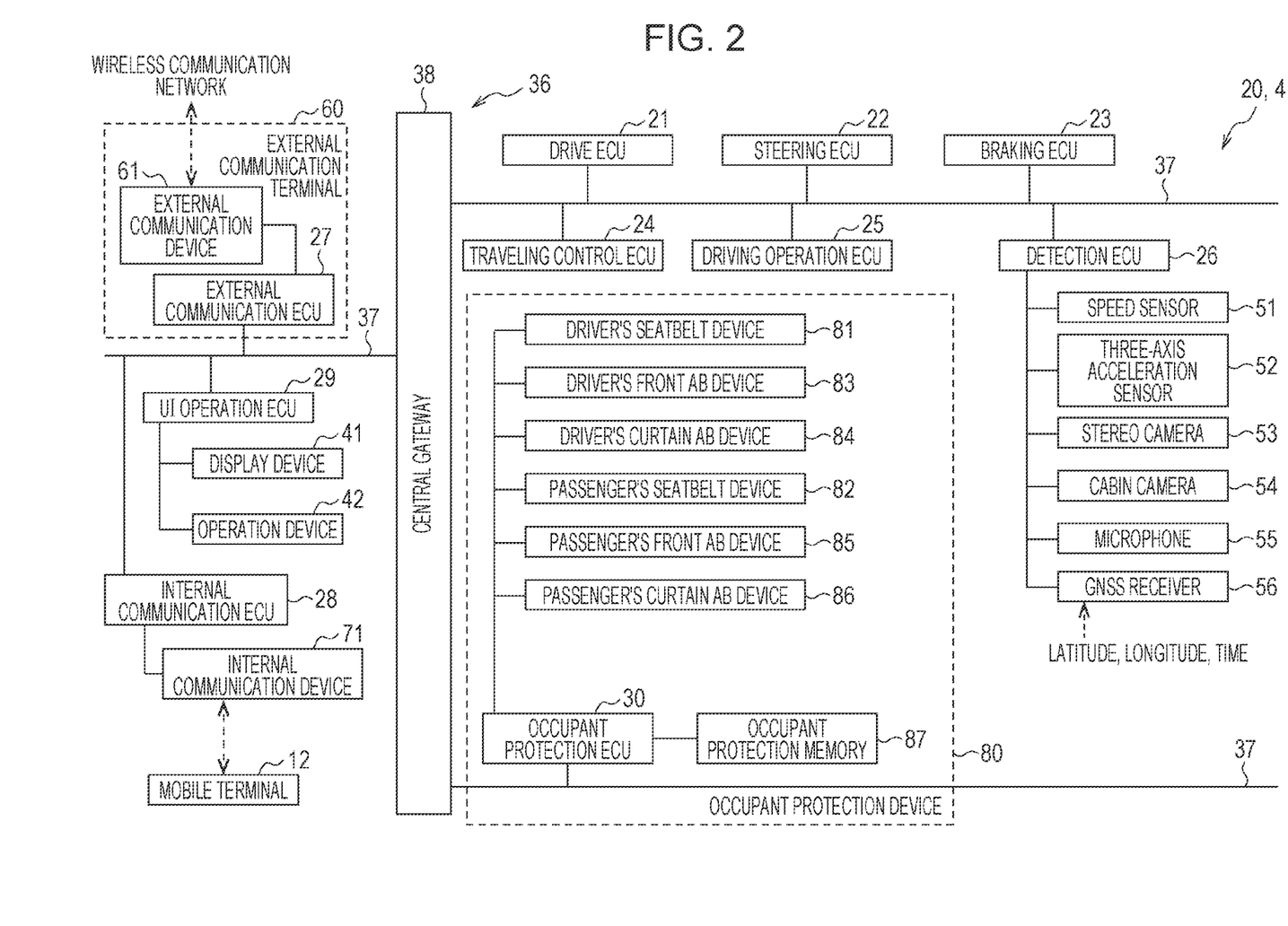
FIG. 2 is an explanatory diagram of a control system that can serve as an automatic reporting device in an automobile that may have an emergency such as an accident in FIG. 1.

FIG. 2 is an explanatory diagram of a control system 20 that can serves as an automatic reporting device 4 in an automobile 10 that may have an emergency such as an accident in FIG. 1.

In the control system 20 of the automobile 10 in FIG. 2, a plurality of controllers are represented by control electronic control units (ECUs) mounted on the respective controllers. Each controller may have not only the control ECU but also, for example, a memory that records a control program and data, an input/output port coupled to either one of a control target and its condition detector, a timer that measures a period and a time, and an internal bus that couples those devices.

Examples of the control ECUs illustrated in FIG. 2 include a drive ECU 21, a steering ECU 22, a braking ECU 23, a traveling control ECU 24, a driving operation ECU 25, a detection ECU 26, an external communication ECU 27, an internal communication ECU 28, a UI operation ECU 29, and an occupant protection ECU 30. The control system 20 of the automobile 10 may have other control ECUs (not illustrated).

The control ECUs are coupled to a vehicle network 36 such as a controller area network (CAN) or a local interconnect network (LIN) employed in the automobile 10. The vehicle network 36 may include a plurality of bus cables 37 that can couple the control ECUs, and a central gateway (CGW) 38 serving as a repeater coupled to the bus cables 37. The control ECUs have different IDs serving as identification information. Basically, each control ECU periodically outputs data to other control ECUs. The data includes an ID of a source control ECU and an ID of a destination control ECU. For example, each of the other control ECUs monitors the bus cables 37 and acquires data and executes processes based on the data when the destination ID is directed to the control ECU. The central gateway 38 monitors the coupled bus cables 37 and, when detecting a control ECU coupled to a bus cable 37 different from that of the source control ECU, outputs data to the bus cable 37. Through the repeating process of the central gateway 38, the control ECUs can exchange data with other control ECUs coupled to bus cables 37 different from those coupled to the source bus cables 37.

For example, a display device 41 and an operation device 42 are coupled to the UI operation ECU 29 as user interfaces for an occupant of the automobile 10. Examples of the display device 41 include a liquid crystal display and a projector. Examples of the operation device 42 include a touch panel, a keyboard, and a non-contact operation detector. For example, the display device 41 and the operation device 42 may be mounted in an occupant's cabin. The UI operation ECU 29 acquires data from the vehicle network 36 and displays the data on the display device 41. The UI operation ECU 29 outputs operations input on the operation device 42 to the vehicle network 36. The UI operation ECU 29 may execute processes based on the input operations, and incorporate results of the processes as data. For example, the UI operation ECU 29 may cause the display device 41 to display a navigation screen for setting destinations, search for a route to a destination selected by inputting an operation, and incorporate the route as route data. The route data may include attribute information such as lanes of roads from a departing location to the destination.

Operation members such as a steering wheel, a brake pedal, an accelerator pedal, and a select lever of transmission (these are not illustrated) are coupled to the driving operation ECU 25 for the occupant to control traveling of the automobile 10. When any operation member is operated, the driving operation ECU 25 outputs, to the vehicle network 36, data including the presence or absence of an operation and an operation amount. The driving operation ECU 25 may execute processes related to the operations on the operation members, and incorporate results of the processes as data. For example, when the accelerator pedal is operated in a situation in which either one of a moving object and a stationary object is present in a traveling direction of the automobile 10, the driving operation ECU 25 may make determination about an abnormal operation and incorporate a result of the determination as data.

Detection members for detection of traveling conditions of the automobile 10 are coupled to the detection ECU 26. Examples of the detection members include a speed sensor 51 that detects a speed of the automobile 10, a three-axis acceleration sensor 52 that detects an acceleration of the automobile 10, a stereo camera 53 that images surroundings of the automobile 10, a cabin camera 54 that images the occupant in the cabin, a microphone 55 that generates data on external and internal sounds, and a GNSS receiver 56 that detects a location of the automobile 10. The GNSS receiver 56 receives radio waves from the GNSS satellites 110 to acquire a current time and a latitude and a longitude serving as a current location of the automobile 10. The detection ECU 26 acquires detection information from each detection member, and outputs data including the detection information to the vehicle network 36. The detection ECU 26 may execute processes based on the detection information, and incorporate results of the processes as data. For example, when the three-axis acceleration sensor 52 detects an acceleration higher than a collision detection threshold, the detection ECU 26 may make determination about collision detection and incorporate a result of the collision detection as data. The detection ECU 26 may extract, from an image obtained by the stereo camera 53, objects around the automobile 10 such as a pedestrian, a different automobile 10, a roadside tree, a utility pole, and a guardrail, make determination about types and attributes of the objects, estimate relative directions and relative distances of the objects or moving directions when the objects are moving based on positions, sizes, and changes of the objects in the image, and output data including prediction information related to collision with the other objects and including results of the estimation to the vehicle network 36.

An external communication device 61 is coupled to the external communication ECU 27. The external communication device 61 establishes wireless communication with a base station 6 of the wireless communication network 5 near the automobile 10. The external communication ECU 27 exchanges data with the server 2 via the wireless communication network 5 through the wireless communication between the external communication device 61 and the base station 6. Those devices constitute an external communication terminal 60 of the automobile 10. A mobile terminal may be used as the external communication terminal 60.

An internal communication device 71 is coupled to the internal communication ECU 28. The internal communication device 71 establishes close-proximity wireless communication with a mobile terminal 12 of the occupant in the automobile 10. The internal communication ECU 28 exchanges data with the mobile terminal 12 through the close-proximity wireless communication between the internal communication device 71 and the mobile terminal 12. The mobile terminal 12 may basically be a terminal that can establish wireless communication with a nearby base station 6 of the wireless communication network 5.

The traveling control ECU 24 controls traveling of the automobile 10. For example, the traveling control ECU 24 acquires data from the external communication ECU 27, the detection ECU 26, and the driving operation ECU 25 via the vehicle network 36, and executes autonomous or manual driving assistance control for the automobile 10. The traveling control ECU 24 generates traveling control data for the automobile 10 based on the acquired data, and outputs the traveling control data to the drive ECU 21, the steering ECU 22, and the braking ECU 23. The drive ECU 21, the steering ECU 22, and the braking ECU 23 control the traveling of the automobile 10 based on the input traveling control data.

A plurality of seatbelt devices, a plurality of air bag devices, and an occupant protection memory 87 are coupled to the occupant protection ECU 30. Examples of the seatbelt devices include a driver's seatbelt device 81 for a driver of the automobile 10, and a passenger's seatbelt device 82 for a passenger of the automobile 10. Examples of the air bag devices include a driver's front air bag device 83 that inflates in front of the driver, a driver's curtain air bag device 84 that inflates on an outer side of the driver, a passenger's front air bag device 85 that inflates in front of the passenger, and a passenger's curtain air bag device 86 that inflates on an outer side of the passenger. Those devices constitute an occupant protection device 80.

The occupant protection ECU 30 actuates or controls the seatbelt devices and the air bag devices based on either one of prediction information on collision with other objects and information on a result of collision detection from the detection ECU 26.

The occupant protection memory 87 is a computer-readable recording medium and records, for example, setting values and programs to be executed by the occupant protection ECU 30. The occupant protection memory 87 may record information on details of control of the occupant protection ECU 30. The occupant protection ECU 30 reads and executes the programs in the occupant protection memory 87. Thus, the occupant protection ECU 30 may serves as an occupant protection controller of the automobile 10.

Figure 3:
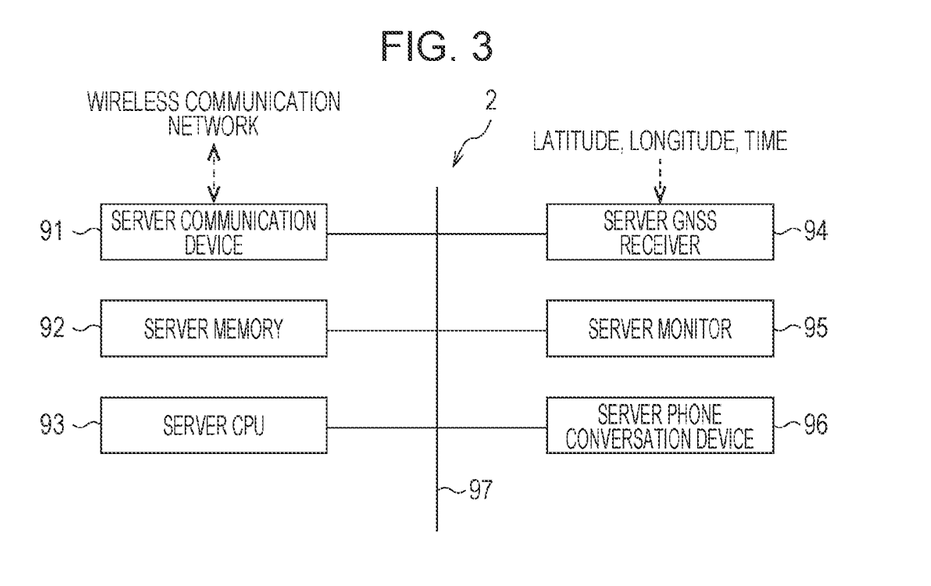
FIG. 3 is an explanatory diagram of a server of a call center in FIG. 1.

FIG. 3 is an explanatory diagram of the server 2 of the call center in FIG. 1.

The server 2 in FIG. 3 includes a server communication device 91, a server memory 92, a server CPU 93, a server GNSS receiver 94, a server monitor 95, a server phone conversation device 96, and a server bus 97 that couples those devices.

The server communication device 91 is coupled to the communication network 7 of the wireless communication network 5. The server communication device 91 exchanges data with other devices such as the client terminal 3 and the external communication terminal 60 serving as the wireless terminal of the automobile 10 via the wireless communication network 5.

The server GNSS receiver 94 acquires a current time by receiving a radio wave from the GNSS satellite 110. The server 2 may have a server timer (not illustrated) to be calibrated based on the current time from the server GNSS receiver 94.

The server monitor 95 displays information of the server 2. For example, the server monitor 95 displays emergency information received by the server 2 from an automobile 10 in an accident.

The server phone conversation device 96 is used by an operator of the call center to have a phone conversation with a user of the mobile terminal 12 coupled by using the server communication device 91.

The server memory 92 is a computer-readable recording medium and records, for example, setting values and programs to be executed by the server CPU 93. The server memory 92 may record information on details of control of the server CPU 93. The server CPU 93 reads and executes the programs in the server memory 92. Thus, the server 2 implements a server controller. The server CPU 93 serving as the server controller manages overall operations of the server 2.

Figure 4:
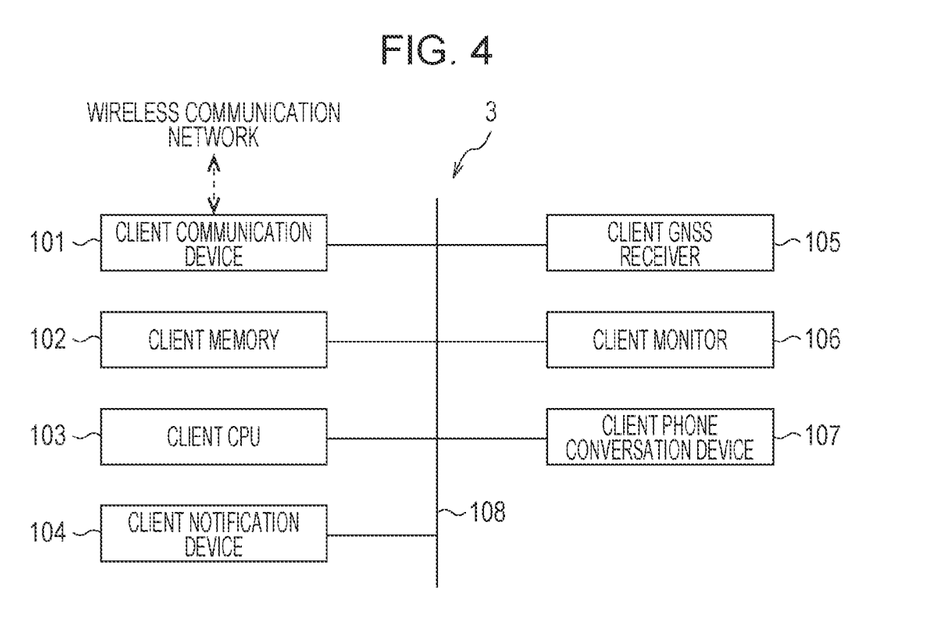
FIG. 4 is an explanatory diagram of a client terminal of an action force in FIG. 1.

FIG. 4 is an explanatory diagram of the client terminal 3 of the action force in FIG. 1.

The client terminal 3 in FIG. 4 includes a client communication device 101, a client memory 102, a client CPU 103, a client notification device 104, a client GNSS receiver 105, a client monitor 106, a client phone conversation device 107, and a client bus 108 that couples those devices.

The client communication device 101 is coupled to the communication network 7 of the wireless communication network 5. The client communication device 101 exchanges data with other devices such as the server 2 and the external communication device 61 serving as the wireless terminal of the automobile 10 via the wireless communication network 5.

The client GNSS receiver 105 acquires a current time by receiving a radio wave from the GNSS satellite 110. The client terminal 3 may have a client timer (not illustrated) to be calibrated based on the current time from the client GNSS receiver 105.

The client monitor 106 displays information of the client terminal 3. For example, the client monitor 106 displays a call for action from the server 2.

The client notification device 104 outputs a sound indicating the call for action to a staff of the action force.

The client phone conversation device 107 is used by the staff member of the action force to have a phone conversation with the user of the mobile terminal 12 coupled by using the client communication device 101.

The client memory 102 is a computer-readable recording medium and records, for example, setting values and programs to be executed by the client CPU 103. The client memory 102 may record information on details of control of the client CPU 103. The client CPU 103 reads and executes the programs in the client memory 102. Thus, the client terminal 3 implements a client controller. The client CPU 103 serving as the client controller manages overall operations of the client terminal 3.

Figure 5:
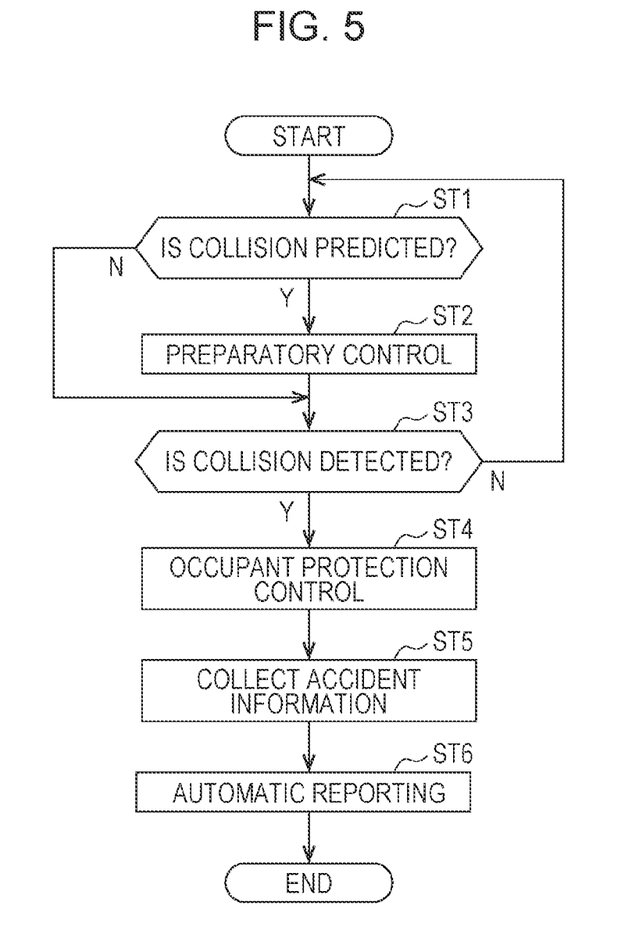
FIG. 5 is a flowchart illustrating a flow of occupant protection control and automatic emergency reporting processes to be executed by the automobile in the accident in the automatic emergency reporting system of FIG. 1.

FIG. 5 is a flowchart illustrating a flow of occupant protection control and automatic emergency reporting processes to be executed by the automobile 10 in the accident in the automatic emergency reporting system 1 of FIG. 1.

The automobile 10 repeatedly executes the processes of FIG. 5 to control the automatic transmission of the emergency information to the server 2 using the transmitter in the emergency of the automobile 10.

In Step ST1, the detection ECU 26 predicts collision. For example, the detection ECU 26 may predict collision by determining whether any moving object is approaching the automobile 10 based on an image obtained by the stereo camera 53. When no collision is predicted, the detection ECU 26 advances the processes to Step ST3. When the detection ECU 26 predicts that the collision is inevitable, the detection ECU 26 transmits prediction information to the occupant protection ECU 30, and advances the processes to Step ST2.

In Step ST2, the occupant protection ECU 30 executes preparatory control to protect the occupant based on the prediction information transmitted in Step ST1. The occupant protection ECU 30 selects a seatbelt device and an air bag device to be actuated. The occupant protection ECU 30 may select a seatbelt device of the occupant's seat and an air bag device that will inflate on a side where the upper body of the occupant may fall down due to the collision. The occupant protection ECU 30 takes up a surplus part of the seatbelt of the selected seatbelt device to achieve a pre-tensioned state. Based on an input direction and an intensity of the predicted collision, the occupant protection ECU 30 selects an air bag device that will inflate on the side where the upper body of the occupant may fall down due to the collision.

The occupant protection ECU 30 may execute other processes. For example, the occupant protection ECU 30 may pre-inflate the air bag device.

In Step ST3, the detection ECU 26 detects the collision. For example, the detection ECU 26 detects the collision when the magnitude of an acceleration detected by the three-axis acceleration sensor 52 is higher than the predetermined threshold. When the collision is detected, the detection ECU 26 transmits collision detection information to the occupant protection ECU 30, and advances the processes to Step ST4. When no collision is detected, the detection ECU 26 returns the processes to Step ST1. The detection ECU 26 may return the processes to Step ST1 when no collision is detected though a predetermined period has elapsed from the start of the processes.

In Step ST4, the occupant protection ECU 30 executes the occupant protection control. The occupant protection ECU 30 actuates a selected seatbelt device and a selected air bag device. Thus, the seated occupant can be held on the seat and a shock can be absorbed by the air bag even if the occupant is thrown off the seat.

In this embodiment, the occupant protection control is executed after the collision is detected in Step ST4, but may be executed at the stage of preparatory control in Step ST2 subsequent to the prediction of the collision in Step ST1.

In Step ST5, the occupant protection ECU 30 collects accident information. For example, the occupant protection ECU 30 collects at least information on the magnitude and the direction of an acceleration detected by the three-axis acceleration sensor 52 at the collision in the accident, information on a site and a time of the accident that are acquired by the GNSS receiver 56, and information on the seatbelt device and the air bag device actuated by the occupant protection ECU 30.

In Step ST6, the occupant protection ECU 30 executes automatic reporting. The occupant protection ECU 30 transmits the collected accident information to the server 2 by using the external communication device 61 serving as the transmitter communicable with the server 2 based on the detection of the accident of the automobile 10. In one example, the external communication device 61 may serve as a communicator of the automobile 10 to transmit emergency information related to the emergency such as the accident of the automobile 10 to the server 2 for a call for emergency action.

Figure 6:
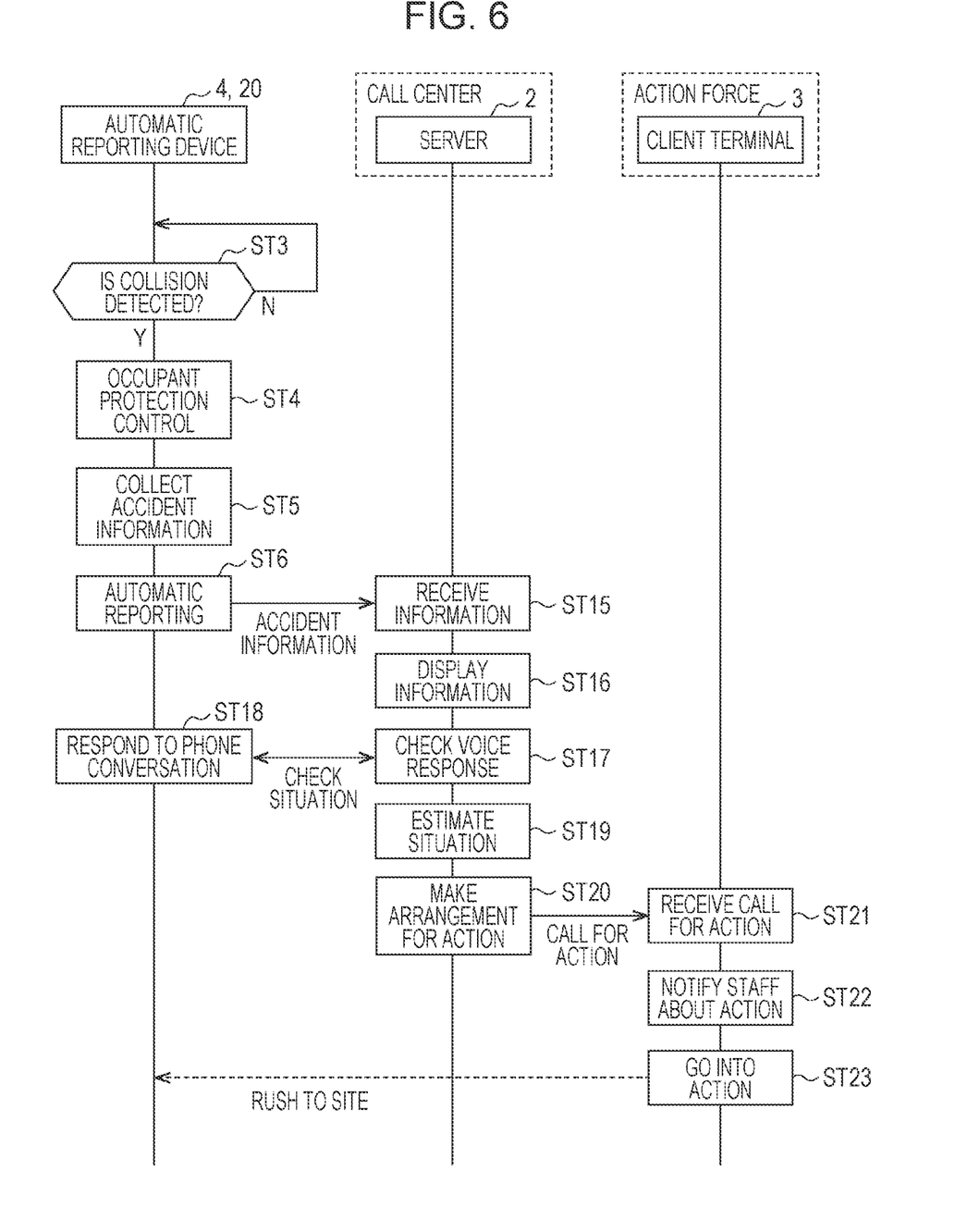
FIG. 6 is a sequence chart illustrating a flow of a series of processes in the automatic emergency reporting system of FIG. 1 based on the processes of FIG. 5.

FIG. 6 is a sequence chart illustrating a flow of a series of processes in the automatic emergency reporting system 1 of FIG. 1 based on the processes of FIG. 5.

FIG. 6 illustrates the control system 20 serving as the automatic reporting device 4 of the automobile 10, the server 2 of the call center, and the client terminal 3 of the action force. Time advances from top to bottom.

In Step ST3, the detection ECU 26 of the automobile 10 detects collision of the automobile 10.

In Step ST4, the detection ECU 26 of the automobile 10 outputs information on a result of the collision detection to the vehicle network 36. The occupant protection ECU 30 executes occupant protection control by actuating the seatbelt devices 81 and 82 and the air bag devices 83 to 86 based on the output information.

In Step ST5, the occupant protection ECU 30 of the automobile 10 collects accident information. The occupant protection ECU 30 collects accident information such as an operation status of the occupant protection device 80 in the accident, a site of the accident, and an input direction and an intensity of a shock caused by the accident.

In Step ST6, the external communication ECU 27 of the automobile 10 executes automatic reporting based on the information on the result of the collision detection from the detection ECU 26 to the vehicle network 36 and, depending on cases, the accident information output from the occupant protection ECU 30 to the vehicle network 36.

In Step ST15, the server communication device 91 of the server 2 of the call center receives the information automatically reported from the automobile 10 in the accident. The received information may be recorded in the server memory 92.

In Step ST16, the server CPU 93 of the server 2 of the call center displays the received information on the server monitor 95. The operator of the call center can check details of the accident of the automobile 10 based on the displayed accident information.

In Step ST17, the server CPU 93 of the server 2 of the call center communicates with the external communication ECU 27 of the automobile 10 in the accident. In Step ST18, the occupant protection ECU 30 of the automobile 10 responds to a voice call. Thus, a phone conversation line is established to make a phone conversation between the server phone conversation device 96 and, for example, the microphone 55 of the automobile 10. The operator of the call center checks the occupant's safety and health level by voice. Thus, the operator can directly check conditions such as how the occupant of the automobile 10 in the accident is injured. The operator may input check results to the server 2.

In Step ST19, the server CPU 93 of the server 2 of the call center estimates the situation. The server CPU 93 may estimate the situation based on the automatically reported information received by the server communication device 91 and the information input by the operator of the call center. The server CPU 93 may estimate the situation through a process of artificial intelligence making comparison with previous accident information. The operator may estimate the situation by considering the situation comprehensively, and input an estimation result to the server 2.

In Step ST20, the server CPU 93 of the server 2 of the call center makes arrangement for action. The server CPU 93 uses the server communication device 91 to transmit a call for action to the client terminal 3 of the action force. The server CPU 93 may transmit the call for action based on an operation by the operator of the call center.

In Step ST21, the client communication device 101 of the client terminal 3 of the action force receives the call for action from the server 2. The received call for action may be recorded in the client memory 102.

In Step ST22, the client CPU 103 of the client terminal 3 of the action force notifies the staff about action. The client CPU 103 causes the client notification device 104 to output a sound indicating the call for action based on the reception of the call for action by the client communication device 101. The client CPU 103 may display a screen of the call for action on the client monitor 106. The screen may show the automatically reported information and the information input by the operator of the call center.

In Step ST23, the staff members of the action force go into action. The staff members can grasp, based on the sound and the screen of the call for action, that the call for action is made to their action force, and take an emergency action by using either one of the rescue helicopter and the ambulance 11.

When the automobile 10 has an emergency such as an accident, the automobile 10 can automatically report the emergency. For example, in the advanced automatic collision notification (AACN), the automobile 10 in the accident uses its automatic reporting device 4 to transmit, to the server 2 of the call center, accident information such as an operation status of the occupant protection device in the accident, a site of the accident, and an input direction and an intensity of a shock caused by the accident. In the call center, the server 2 checks the received accident information and makes a call for action to either one of an air medical service and an emergency medical force. Thus, a lead time for either one of the rescue helicopter and the ambulance 11 that is going into action can be shortened to increase a possibility of saving a person in the accident. In the automatic emergency reporting system 1, emergency information can automatically be transmitted from the predetermined communication device of the automobile 10 in the emergency to the server 2 to cause either one of the rescue helicopter and the ambulance 11 to rush to the site appropriately.

When the automatic reporting device 4 of the automobile 10 in the accident transmits the accident information, the accident or other factors may hinder the automatic reporting device from appropriately establishing communication immediately after the accident. For example, the automatic reporting device 4 may malfunction due to the accident. For example, the automatic reporting device 4 that has transmitted positional information may malfunction due to the accident before transmitting the accident information. For example, an information source device such as the GNSS receiver 56 of the automobile 10 may malfunction due to the accident to cause a possibility that the automatic reporting device 4 cannot transmit correct information to the server 2 though the automatic reporting device 4 functions properly. In those cases, the server 2 can properly receive the information transmitted from the automobile 10 but the received information may indicate an incorrect location of the automobile 10.

In those cases, the server 2 that makes a call for emergency action in the automatic emergency reporting system 1 cannot acquire appropriate information on the automobile 10 in the accident for the call.

In the automatic emergency reporting system 1, it is desirable that, even in the situations described above, the information on the automobile 10 in the accident can be acquired promptly and either one of the rescue helicopter and the emergency medical force can appropriately take the emergency action.

The automatic emergency reporting system 1 of this embodiment uses the mobile terminal 12 of the occupant of the automobile 10 and a mobile terminal 12 of, for example, a pedestrian around the site of the accident as illustrated in FIG. 1.

The mobile terminal 12 may have a configuration similar to that of the client terminal 3 of FIG. 4. In this case, the mobile terminal 12 includes a terminal communication device, a terminal memory, a terminal CPU, a terminal notification device, a terminal GNSS receiver, a terminal display, a terminal phone conversation device, and a terminal bus that couples those devices.

Figure 7:
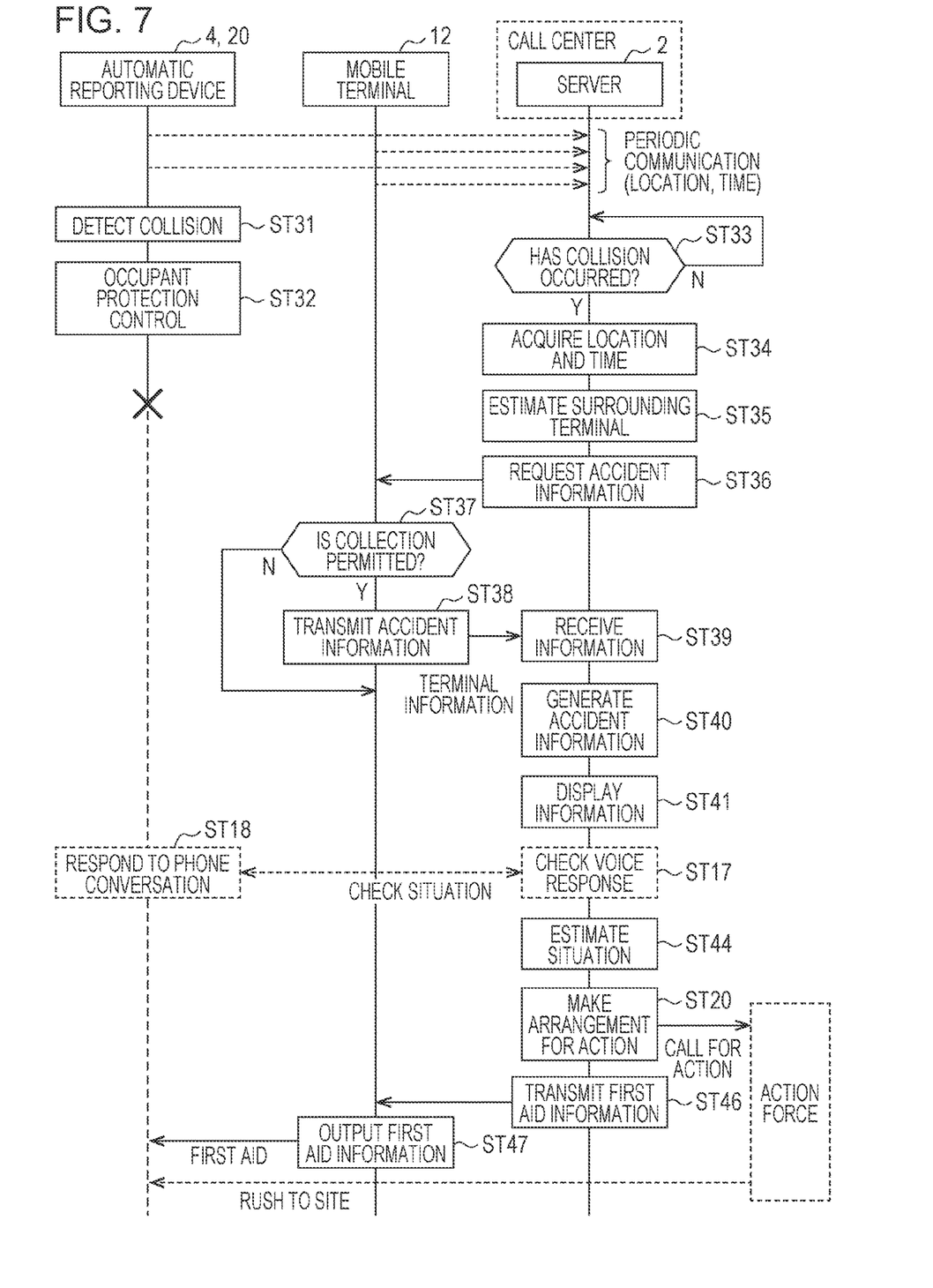
FIG. 7 is a sequence chart illustrating a flow of processes in the automatic emergency reporting system of FIG. 1 using a surrounding mobile terminal in a case where the automobile in the accident cannot directly and automatically report the emergency to the server.

FIG. 7 is a sequence chart illustrating a flow of processes in the automatic emergency reporting system 1 of FIG. 1 using a surrounding mobile terminal 12 in a case where the automobile 10 in the accident cannot directly and automatically report the emergency to the server 2. FIG. 7 illustrates the control system 20 serving as the automatic reporting device 4 of the automobile 10, the server 2 of the call center, and the mobile terminal 12 of the pedestrian around the site of the accident. The mobile terminal 12 may be the mobile terminal 12 of the occupant who has escaped out of the automobile. In FIG. 7, processes between the server 2 and the client terminal 3 of the action force are similar to those in FIG. 6 and therefore omitted. Time advances from top to bottom.

In FIG. 7, the automatic reporting device 4 of the automobile 10 in a normal state periodically transmits information on its location and time to the server 2. The mobile terminal 12 periodically communicates with either one of a base station 6 and a server (not illustrated) of a carrier that manages the base station 6. For example, either one of the server and the base station 6 of the carrier can grasp the location of the mobile terminal 12 for handover of the base station 6 and information services.

In Step ST31, the detection ECU 26 of the automobile 10 detects collision.

In Step ST32, the occupant protection ECU 30 of the automobile 10 executes the occupant protection control. Then, the occupant protection ECU 30 executes the series of processes of FIG. 5 but cannot appropriately communicate with the server 2 due to, for example, a shock caused by the accident. Therefore, the occupant protection ECU 30 cannot appropriately transmit collected accident information to the server 2.

For example, the automatic reporting device 4 may malfunction due to the shock caused by the accident before transmitting the accident information, thereby causing a possibility that the accident information including collision detection information and positional information of the automobile at the time of detection cannot be transmitted. For example, the automatic reporting device 4 may transmit the collision detection information and the positional information of the automobile immediately after the collision detection, but then malfunction due to either one of deformation of the automobile and loss of power, thereby causing a possibility that accident information such as an operation status of the occupant protection device in the accident, a site of the accident, and an input direction and an intensity of the shock caused by the accident cannot be transmitted.

In Step ST33, the server CPU 93 of the server 2 estimates or recognizes the occurrence of collision. The server CPU 93 estimates the collision of the automobile 10 with no accident information received from the automobile 10. For example, the server CPU 93 may estimate the collision when the information on the location and time is not periodically received from the automatic reporting device 4 of the automobile 10.

The server CPU 93 can recognize the collision when a part of the accident information such as the collision detection is received from the automobile 10.

When the occurrence of collision of the automobile 10 is estimated in Step ST33, the server CPU 93 of the server 2 estimates a location and time in the accident in Step ST34. For example, the server CPU 93 may estimate a location of the automobile 10 and a time when the information is not periodically received based on the latest location and speed of the automobile 10 that have already been received. In one example, the server CPU 93 may serve as a "location estimator" to manage the automobiles 10 through periodic communication and estimate positional information of an automobile 10 that may have an emergency. When the positional information is not periodically acquired from the automobile 10, the server CPU 93 determines that the emergency may occur and estimates the positional information based on information on the automobile 10 that has already been acquired.

When the occurrence of collision of the automobile 10 is recognized in Step ST33, the server CPU 93 of the server 2 acquires information on a location and time in the accident. When no information is acquired, the server CPU 93 estimates the location and time as in the case where the occurrence of collision is estimated.

In Step ST35, the server CPU 93 of the server 2 estimates a surrounding mobile terminal 12 at the site of the accident.

For example, the server CPU 93 communicates with the base stations 6 and the servers of the carriers of the mobile terminals 12 to estimate any mobile terminal 12 located around the site of the accident at the estimated time of the occurrence of the accident. In one example, the server CPU 93 may serve as a "terminal estimator" to estimate any mobile terminal 12 located around the site of the accident at the time of the accident by using pieces of positional information of the mobile terminals 12 that are acquired from the base stations 6 and the servers of the carriers. The server CPU 93 may estimate any mobile terminal 12 located around the site of the accident after the time of the accident by using the pieces of positional information of the mobile terminals 12. The mobile terminals 12 may include the mobile terminal 12 of the occupant of the automobile 10 in the accident.

When information on the occupant's mobile terminal 12 is acquired from the automobile 10 at or before the time of the occurrence of the emergency, the server CPU 93 may estimate the occupant's mobile terminal 12 as the mobile terminal 12 around the location indicated by the positional information of the automobile 10.

Although FIG. 7 illustrates one mobile terminal 12, the server CPU 93 may estimate a plurality of mobile terminals 12.

In Step ST36, the server CPU 93 of the server 2 accesses the estimated mobile terminal 12 and transmits an accident information request.

The server 2 may request not only information held by the mobile terminal 12 but also collection of further information.

In Step ST37, after the terminal communication device of the mobile terminal 12 receives the accident information request, the terminal CPU determines whether to permit collection of terminal information. For example, the terminal CPU may cause the terminal display to display a selection screen for permission, and determine whether to permit the collection in response to user's selection on the selection screen. For example, the terminal CPU may determine whether to permit the collection based on a permission/non-permission presetting on the mobile terminal 12. When the collection is permitted, the terminal CPU advances the processes to Step ST38. When the collection is not permitted, the terminal CPU skips Step ST38.

In Step ST38, the terminal CPU of the mobile terminal 12 causes the terminal communication device to transmit the information of the mobile terminal 12 to the server 2 as accident information. Examples of the information of the mobile terminal 12 include an image showing the scene of the accident and captured by a person who has found the accident, accident finding information, and details of a report from the mobile terminal 12 to an organization other than the organization that manages road accidents. The captured image may contain tag information about either one of a current position of the mobile terminal 12 and a position of the mobile terminal 12 when the image is captured.

In Step ST39, the server CPU 93 of the server 2 receives the accident information from the mobile terminal 12. The received accident information is the information of the mobile terminal 12 that is available for determination about the accident. In one embodiment, the server CPU 93 may serve as an "information acquirer" to access the estimated mobile terminal 12 and acquire the information of the mobile terminal 12 from the mobile terminal 12 when permitted. The server CPU 93 collects the information held by the estimated mobile terminal 12 from the mobile terminal 12. The accident information may contain an image captured by the mobile terminal 12 at or around the time of the accident, a location of the mobile terminal 12, and sensor log information of the mobile terminal 12. The mobile terminal 12 in the automobile 10 in the accident may have a log of an acceleration greater than usual. In this case, the server CPU 93 uses the information of the mobile terminal 12 that is estimated, based on its positional information, to be located around the automobile 10 that may have the emergency, thereby acquiring information on the automobile 10. The server CPU 93 may collect pieces of information of a plurality of estimated mobile terminals 12.

When accident information such as an operation status of the occupant protection device in the accident, a site of the accident, and an input direction and an intensity of a shock caused by the accident is appropriately transmitted from the automatic reporting device 4 to the server 2, the server CPU 93 can empirically estimate an injured part of the occupant and a state of the injury by using the acquired accident information. For example, when the information indicates that the shock was input obliquely to the front at an intensity equal to or larger than a threshold, occupants sat on a driver's seat and a passenger's seat, and the occupant protection device operated, the server CPU 93 can empirically estimate the degrees of shocks on the heads, chests, waists, and legs of the occupants, injuries to the heads due to turns uniquely caused at the right and left front seats due to the oblique collision, and injuries to the chests due to upper body movement relative to the seatbelts.

When the accident information such as the operation status of the occupant protection device in the accident, the site of the accident, and the input direction and the intensity of the shock caused by the accident cannot appropriately be transmitted from the automatic reporting device 4 to the server 2, the server CPU 93 cannot acquire the accident information and may therefore have difficulty in estimating the injured part of the occupant and the state of the injury.

It is desirable to compensate the lack of the accident information with the information collected from the estimated mobile terminal 12 so that the server CPU 93 can estimate the injured part of the occupant and the state of the injury to some extent.

In Step ST40, the server CPU 93 of the server 2 generates accident information based on the acquired information of the mobile terminal 12. Based on the captured image showing the scene of the accident, the server CPU 93 may determine whether any person is injured, a position of the injured person in the automobile, and the degree of the injury. Based on the captured image, the server CPU 93 may estimate the input direction and the intensity of the shock from the degree of damage to the automobile 10, a portion having significant damage, deformation of the cabin, and the inflated air bags. When the mobile terminal 12 in the automobile 10 has an acceleration log showing a high acceleration in the accident, the server CPU 93 may estimate the injured person based on the acceleration log. In this manner, the server CPU 93 generates the accident information.

In Step ST41, the server CPU 93 of the server 2 displays the generated accident information on the server monitor 95. The operator of the call center can check details of the accident of the automobile 10 based on the displayed accident information.

In Step ST44, the server CPU 93 of the server 2 of the call center estimates the situation. The server CPU 93 may estimate the situation based on the information received by the server communication device 91 and information input by the operator of the call center. The server CPU 93 may estimate the situation through an estimation process of artificial intelligence making comparison with previous accident information. The operator may estimate the situation by considering the situation comprehensively, and input an estimation result to the server 2.

When the accident information is appropriately transmitted from the automatic reporting device 4 to the server 2, the server CPU 93 of the server 2 of the call center can probably estimate the situation of the occupant due to the accident of the automobile 10. The automobile 10 has a prediction value of injuries based on a cumulative number of accidents obtained through safety tests prior to shipment to the market. The server CPU 93 can estimate the degree of the injury of each occupant due to the accident by comparing this information with the information on the actual accident.

Even if the accident information cannot appropriately be transmitted from the automatic reporting device 4 to the server 2, the server CPU 93 of the server 2 of the call center can grasp, for example, the degree of damage to the automobile 10 after the accident based on the information from the mobile terminal 12 at the site of the accident. For example, the server CPU 93 can estimate the degree of the injury of each occupant due to the accident based on the degree of the damage to the automobile 10.

In Step ST20, the server CPU 93 of the server 2 of the call center makes arrangement for action depending on, for example, the estimated degree of the injury of the occupant. The server CPU 93 uses the server communication device 91 to transmit a call for action to the client terminal 3 of the action force. The server CPU 93 may transmit the call for action based on an operation by the operator of the call center.

In Step ST46, the server CPU 93 of the server 2 transmits first aid information to the estimated mobile terminal 12 depending on, for example, the estimated degree of the injury of the occupant. Examples of the first aid information include information on life-saving treatment such as resuscitation. In this case, the server CPU 93 transmits feedback information related to the emergency to the mobile terminal 12 from which information has been acquired.

In Step ST47, the terminal CPU of the mobile terminal 12 outputs the received first aid information to the display or the like. Thus, the user of the mobile terminal 12 can give first aid depending on, for example, the estimated degree of the injury of the occupant at the site of the accident.

In the embodiment described above, when the positional information of the automobile 10 that may have the emergency cannot be acquired from the automobile 10, the server 2 estimates the location of the automobile 10 and estimates the mobile terminal 12 around the estimated location. The server 2 acquires information held by the estimated mobile terminal 12 from the mobile terminal 12. Even if the server 2 cannot directly and automatically receive the emergency information from the automobile 10 in the emergency, the server 2 can acquire equivalent information available for grasping of the emergency from the mobile terminal 12 that may be located around the automobile 10. Even in the case where the server 2 cannot directly and automatically receive sufficient emergency information to determine the situation from the automobile 10 in the emergency, the server 2 can acquire information from the mobile terminal 12 around the automobile 10 and make a call for emergency action while detecting or estimating, for example, either one of the collision of the automobile 10 and details and degree of damage caused by the collision.

In this embodiment, when the positional information is not periodically acquired from the automobile 10, the server 2 determines that the emergency may occur and estimates the positional information based on information on the automobile 10 that has already been acquired. For example, when the positional information is not periodically acquired from the automobile 10 and the collision is detected or estimated around the automobile 10, the server 2 may determine that the emergency may occur and estimate the positional information based on information on the automobile 10 that has already been acquired.

There is a possibility that the predetermined communication device of the automobile 10 cannot communicate with the server 2 due to the emergency such as the accident. Further, the information source device such as the GNSS receiver 56 of the automobile 10 may malfunction due to the accident to cause a possibility that the automatic reporting device 4 cannot transmit correct information to the server 2 though the automatic reporting device 4 functions properly. In this case, the server 2 can properly receive the information transmitted from the automobile 10 but the received information may indicate an incorrect location of the automobile 10. In this embodiment, it is possible to estimate probable positional information of the automobile 10 that may have the emergency.

In this embodiment, when information on the mobile terminal 12 is acquired from the automobile 10 at or before the time of the occurrence of the emergency, the information acquirer estimates this mobile terminal 12 as the mobile terminal 12 around the location indicated by the positional information. In this embodiment, the information held by the mobile terminal 12 can complement the information on the automobile 10 that may have the emergency. Details of the emergency such as the accident can be grasped more accurately by complementing information on the details.

In this embodiment, the estimated mobile terminal 12 is accessed and the information of the mobile terminal 12 is acquired from the mobile terminal 12 when permitted. Thus, the information of the mobile terminal 12 can be collected in accordance with, for example, privacy policy of the user of the mobile terminal 12.

In this embodiment, the server 2 transmits the feedback information on life-saving treatment or the like related to the emergency to the mobile terminal 12 from which information has been acquired. Thus, at a time point when the feedback information is transmitted, appropriate feedback information can be provided to a person around the automobile 10 in the emergency.

The embodiment described above is an exemplary embodiment of the disclosure, but the embodiment of the disclosure is not limited to this embodiment, and various modifications and changes may be made without departing from the gist of the disclosure.

In the embodiment described above, the plurality of ECUs are provided separately in the automobile 10, but a subset or all of the ECUs may be integrated into a single ECU.

In the embodiment described above, the location estimator, the terminal estimator, and the information acquirer are provided in the server 2.

For example, the location estimator may be provided in the automobile 10 that may have an emergency. The terminal estimator that communicates with the mobile terminal 12 and the information acquirer that executes processes subsequently may be provided at least in either one of a base station 6 and a cloud outside the automobile 10. In this case, the terminal estimator and the information acquirer may be provided in a server 2 other than the server 2 that makes a call for emergency action.

The control system 20 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the control system 20 including the drive ECU 21, the steering ECU 22, the braking ECU 23, the traveling control ECU 24, the driving operation ECU 25, the detection ECU 26, the external communication ECU 27, the internal communication ECU 28, the UI operation ECU 29, and the occupant protection ECU 30. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. A server for an automatic emergency reporting system of a vehicle, the server being configured to receive emergency information from the vehicle when the vehicle has an emergency, the server comprising:
   a processor; and
   a memory storing programs that, when executed by the processor, cause the processor to:
      periodically receive location information from the vehicle;
      determine that the vehicle has a possibility of occurrence of the emergency when no location information is received from the vehicle;
      estimate a current location of the vehicle based on the previously-received location information from the vehicle;
      communicate other servers or base stations associated with mobile carriers for mobile terminals to find a mobile terminal around the estimated current location of the vehicle;
      acquire information regarding the vehicle from the mobile terminal found around the estimated current location of the vehicle; and
      transmit, to the mobile terminal, first aid information to facilitate life-saving treatment to be performed on an occupant of the vehicle prior to an emergency vehicle arriving based on the information regarding the vehicle acquired from the mobile terminal.

2. The server for the automatic emergency reporting system of the vehicle according to claim 1, wherein the processor is configured to access the mobile terminal.

3. The server for the automatic emergency reporting system of the vehicle according to claim 2, wherein the processor is configured to acquire the information from the mobile terminal when permitted by the mobile terminal.

4. The server for the automatic emergency reporting system of the vehicle according to claim 1,
wherein the information regarding the vehicle acquired from the communication terminal includes an image captured by the communication terminal, and
wherein the programs further cause the processor to generate the first aid information based on the image.

5. The server for the automatic emergency reporting system of the vehicle according to claim 1,
wherein the information regarding the vehicle acquired from the communication terminal includes a log of an acceleration detected by the communication terminal, and
wherein the programs further cause the processor to generate the first aid information based on the log of the acceleration.

6. A server for an automatic emergency reporting system of a vehicle, the server being configured to receive emergency information from the vehicle when the vehicle has an emergency, the server comprising circuitry configured to:
periodically receive location information from the vehicle;
determine that the vehicle has a possibility of occurrence of the emergency when no location information is received from the vehicle;
estimate a current location of the vehicle based on the previously-received location information from the vehicle;
communicate other servers or base stations associated with mobile carriers for mobile terminals to find a mobile terminal around the estimated current location of the vehicle;
acquire information regarding the vehicle from the mobile terminal found around the estimated current location of the vehicle; and
transmit, to the mobile terminal, first aid information to facilitate life-saving treatment to be performed on an occupant of the vehicle prior to an emergency vehicle arriving based on the information regarding the vehicle acquired from the mobile terminal.

7. The server for the automatic emergency reporting system of the vehicle according to claim 6,
wherein the information regarding the vehicle acquired from the communication terminal includes an image captured by the communication terminal, and
wherein the circuitry is configured to generate the first aid information based on the image.

8. The server for the automatic emergency reporting system of the vehicle according to claim 6,
wherein the information regarding the vehicle acquired from the communication terminal includes a log of an acceleration detected by the communication terminal, and
wherein the circuitry is configured to generate the first aid information based on the log of the acceleration.

\* \* \* \* \*